Dec. 19, 1944. W. CONNOLLY 2,365,393
RAKE
Filed May 10, 1943
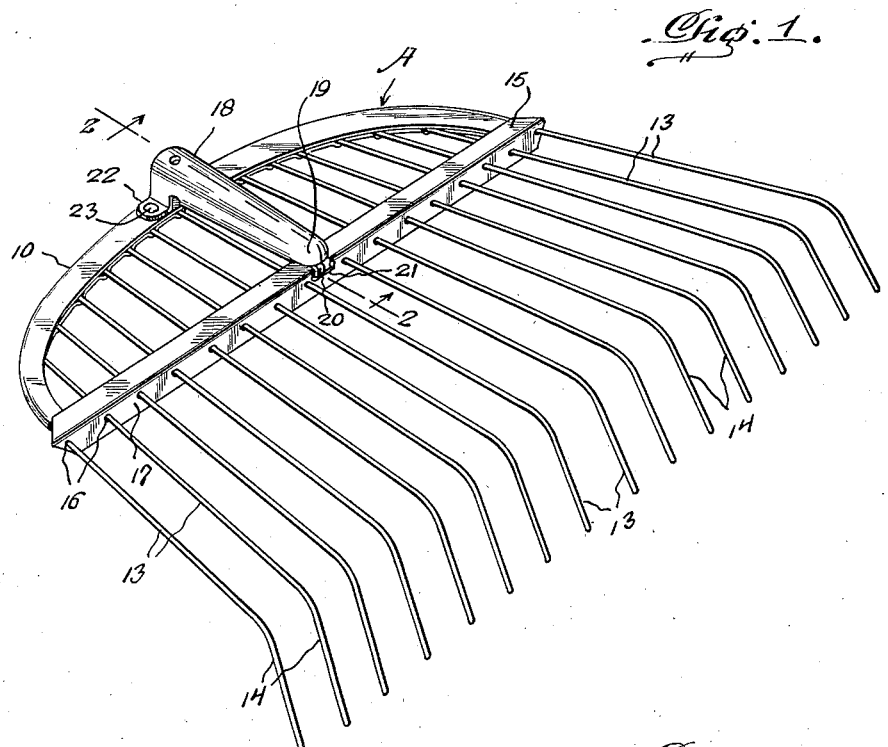
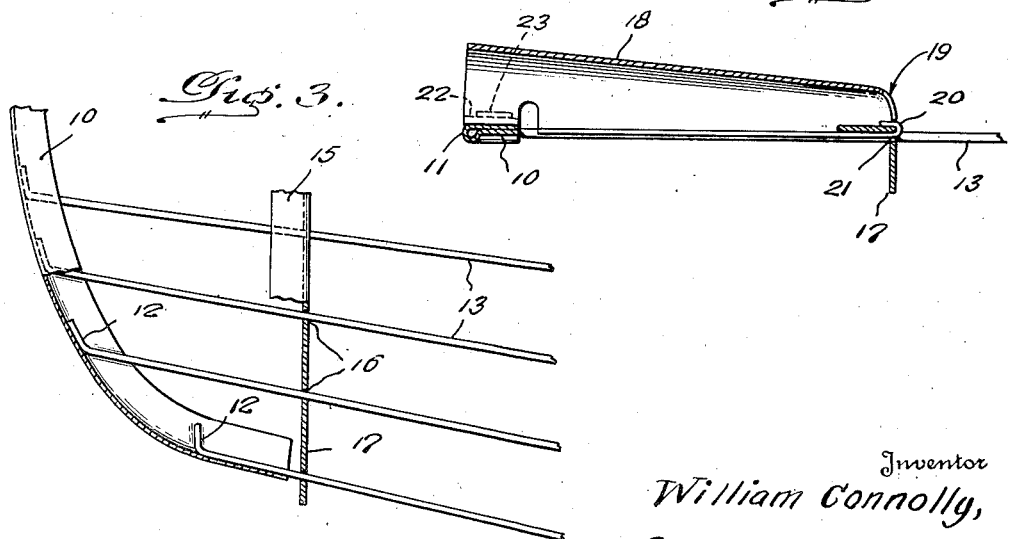
Inventor
William Connolly,
Attorney Patented Dec. 19, 1944

2,365,393

UNITED STATES PATENT OFFICE 2,365,393

RAKE

William Connolly, Farley, Iowa

Application May 10, 1943, Serial No. 486,357

1 Claim. (Cl. 56—400.17)

The invention relates to rakes and more especially to metallic lawn rakes.

The primary object of the invention is the provision of a rake of this character, wherein the construction thereof is such to make the same light in weight, yet definitely strong to withstand severe usage and maximum life, the rake being unique in its make-up, so that the teeth or tines will be reinforced to withstand strains when placed thereon.

Another object of the invention is the provision of a rake of this character, wherein the entire make-up is of metal, being possessed of few parts, these being assembled in a novel manner.

A further object of the invention is the provision of a rake of this character, wherein the handle socket piece functions as a tie member between the crown and the teeth or tine reinforcing bar, while the teeth or tines are fixed in a novel manner within the crown.

A still further object of the invention is the provision of a rake of this character, which is simple in construction, thoroughly reliable and efficient in its purpose, strong, durable, neat in appearance, and inexpensive to manufacture.

With these and other objects in view the invention consists in the features of construction, combination and arrangement of parts, as will be hereinafter more fully described in detail, illustrated in the accompanying drawing, which discloses the preferred embodiment of the invention, and pointed out in the claim hereunto appended. However, it is to be understood that changes, variations and modifications may be made to the invention, as fall properly within the scope of the claim hereto appended, without departing from the spirit of the invention or sacrificing any of its advantages.

In the accompanying drawing:

Figure 1 is a perspective view of the rake constructed in accordance with the invention.

Figure 2 is a section on the line 2—2 of Figure 1.

Figure 3 is a detail section partly broken away.

Similar reference characters indicate corresponding parts throughout the several views in the drawing.

Referring to the drawing in detail A designates generally a rake head or rake body constituting the present invention, preferably made from metal throughout. This head or body A comprises an upwardly arched crown, 10, preferably made from a strip of metal folded on itself with a bead 11 following the fold therein, while in one edge portion or fold flange are fixedly socketed as at 12 the inner ends of raking teeth or tines 13. The teeth or tines 13 at their outer ends are angled as at 14 in the same direction with respect to each other.

Crosswire of the teeth or tines 13 next to the crown 10 is a reinforcing bar 15 of substantially L-shape in cross-section and loosely passing through holes 16 in the flange 17 of said bar 15 are the said teeth or tines 13, these holes 16 being aligned with said teeth or tines.

Located centrally of the crown 10 is a tubular socket member 18 made from a single sheet of metal turned into tubular form for receiving a handle (not shown). This member 18 is tapered and is open at the outer end for the insertion of a handle therein. The member at the inner end is closed by means of inwardly bent portions 19, while next thereto are bendable ears 20, these being passed through a slot 21 formed in the bar 15 centrally thereof and are turned inwardly and upwardly thus securing the member 18 with the said bar and fastening the latter secure.

The open end of the member 18 is formed with laterally bent tongues 22 which are secured to the crown 10 by means of rivets 23 which are passed therethrough and also through the tongues 22. In this manner the member 18 is made secure and also the bar 15 is held in place to create a firm and rigid rake head.

What is claimed is:

A rake of the kind described, comprising a head having an outwardly arched crown piece folded on itself throughout its length, a straight substantially L-shaped reinforcing angle bar crosswise of the crown piece with one angular portion thereof overlying the ends of the said piece, and the other angular portion of such bar projecting beyond one side of the head, tines anchored in the folds of the crown piece and threaded through the projected angular portion of the bar, and a single piece tapered tubular socket member centrally bridging the crown piece and bar and having outturned ears on opposite sides at its larger end secured to the said crown piece, and also provided with bendable tongues on opposite sides at the smaller end, threaded through the said bar and hooked thereover.

WILLIAM CONNOLLY.